(12) United States Patent
Chen et al.

(10) Patent No.: US 7,319,664 B2
(45) Date of Patent: Jan. 15, 2008

(54) REDUNDANT LINK MANAGEMENT SWITCH FOR USE IN A STACK OF SWITCHES AND METHOD THEREOF

(75) Inventors: Huan-Wen Chen, Yunlin (TW); Fuh-Jang Lin, Hsinchu (TW)

(73) Assignee: Accton Technology Corporation, Hsinchu (TW)

( * ) Notice: Subject to any disclaimer, the term of this patent is extended or adjusted under 35 U.S.C. 154(b) by 986 days.

(21) Appl. No.: 10/421,805

(22) Filed: Apr. 24, 2003

(65) Prior Publication Data

US 2003/0193891 A1   Oct. 16, 2003

Related U.S. Application Data

(63) Continuation-in-part of application No. 10/041,505, filed on Jan. 10, 2002, now Pat. No. 7,145,864.

(51) Int. Cl.
*H04L 1/00* (2006.01)
*H04L 12/28* (2006.01)
*G06F 15/177* (2006.01)

(52) U.S. Cl. ............... 370/217; 370/254; 709/221
(58) Field of Classification Search ........ 370/216–224; 709/208–209, 220–222
See application file for complete search history.

(56) References Cited

U.S. PATENT DOCUMENTS

| | | | | |
|---|---|---|---|---|
| 5,805,817 A | * | 9/1998 | Yu et al. | 709/224 |
| 6,330,245 B1 | * | 12/2001 | Brewer et al. | 370/424 |
| 6,467,006 B1 | * | 10/2002 | Alexander et al. | 710/240 |
| 6,684,258 B1 | * | 1/2004 | Gavin et al. | 709/251 |
| 6,928,049 B2 | * | 8/2005 | Shabtay et al. | 370/223 |

* cited by examiner

*Primary Examiner*—Chi Pham
*Assistant Examiner*—Tri H. Phan
(74) *Attorney, Agent, or Firm*—Birch, Stewart, Kolasch & Birch, LLP

(57) ABSTRACT

A stackable switch supporting redundant link and backup management. The stackable switch includes a stacking module, a processor and a management module. Several stackable switches can be stacked together in the form of a closed-loop link topology via the stacking module. The stacking module has an uplink port, a downlink port, and preferably a manual control device. The processor instructs the stacking module to enable or disable a downlink control bus within the downlink port when receiving a reconnect/disconnect command. If a link status, generated from the processor, indicates that these switches are stacked into the closed-loop link topology, the management module issues the disconnect command. Otherwise, the management module issues the reconnect command to recover a redundant link. Provided that the manual control device is activated, the management module in the same switch has the highest priority to become a master agent for the switch stack.

9 Claims, 11 Drawing Sheets

REDUNDANT LINK MANAGEMENT SWITCH FOR USE IN A STACK OF SWITCHES AND METHOD THEREOF

CROSS-REFERENCE TO RELATED APPLICATION

This application is a continuation-in-part of application Ser. No. 10/041,505, filed Jan. 10, 2002 now U.S. Pat. No. 7,145,864, the entire contents of which are hereby incorporated by reference and for which priority is claimed under 35 U.S.C § 120.

BACKGROUND OF THE INVENTION

1. Field of the Invention

The invention relates to computer networks, and more particularly to a stackable switch offering resilient stacking and backup management.

2. Description of the Related Art

A typical computer network consists of nodes (computers), a connecting medium (wired or wireless), and specialized network equipment like routers and hubs. In the case of the Internet, all these pieces working together allow one computer to send information to another computer that may be on the other side of the world. Switches are a fundamental part of most networks. They make it possible for several users to send information over a network at the same time without slowing each other down. Just like routers allow different networks to communicate with each other, switches allow different nodes of a network to communicate directly with each other in a smooth and efficient manner.

The use of stackable switches allows network administrators to build systems having multiple physical ports to various computing resources or workstations on the network. FIG. 1 illustrates a stack of switches that can be constructed by stacking switches 110a~d. To enable the stackable capability of each switch, the switches 110a~d are respectively equipped with stacking modules 112a~d as depicted. The stacking module 112a of the switch 110a is connected to stacking module 112b of the switch 110b with link 120a, and the stacking module 112b of the switch 110b is connected to stacking module 112c of the switch 110c with link 120b. Likewise, link 120c connects the switches 110c and 110d. The benefits of stacking are throughput boost, downlink resource sharing, and easy management. The switch stack 100 delivers high-performance switch-to-switch connections, while conserving ports. Network administrators may manage the entire switch stack 100 as one virtual switch.

However, the entire switch stack 100 is disrupted in the case of single link or single switch failure anywhere in the stack 100. Since the switch stack 100 is arranged as a simple chain, as shown in FIG. 1, without a redundant link, the rest of the switches cannot be stacked together until the network administrator manually solves the problems. To make matters worse, the switch stack with only a single management module can prevent either the entire network or a substantial portion of the network from functioning when a failure only occurs in the single management module.

Therefore, what is needed is a way to automatically recover a switch stack in case of switch or link failure, unencumbered by the limitations associated with the prior art.

SUMMARY OF THE INVENTION

It is an object of the present invention to provide a redundant link for a stack of switches within a network.

It is another object of the present invention to provide a mechanism to detect a failed link within a stack of switches forming a closed-loop link topology.

It is yet another object of the present invention to provide a mechanism to establish backup management in a stack of switches arranged in a closed-loop link topology, which features the inheritable master role to ease management.

The present invention is generally directed to a redundant link management switch for use in a stack of switches forming a closed-loop link topology. The redundant link management switch includes a stacking module, a processor and a management module. The stacking module has an uplink port and a downlink port. The uplink port connects a next-higher switch in the stack, and the downlink port connects a next-lower switch in the stack, in which a link connecting the downlink port and the next-lower switch is a redundant link for the switch stack. The processor instructs the stacking module to disable a downlink control bus within the downlink port when receiving a disconnect command, and instructs the stacking module to enable the downlink control bus when receiving a reconnect command. The processor also provides a link status. The management module performs a redundant link management function, issuing the disconnect command to the processor if the link status indicates that the redundant link management switch and the stack of switches are stacked into the closed-loop link topology. Conversely, the management module issues the reconnect command to the processor to recover the redundant link if the management module detects that the closed-loop link topology has changed. Preferably, a manual control device is disposed on the stacking module. The redundant link management function is enabled when the management module detects that the manual control device has activated. Once the manual control device on the stacking module is activated, the management module in the same switch as the stacking module has the highest priority to become a master agent for the stack of switches.

In another aspect of the invention, a method of managing a redundant link for use in a stack of switches is disclosed. First, every two switches in the switch stack are connected via links including the redundant link to form a closed-loop link topology. A link status is then detected and the redundant link is deactivated if the link status indicates that the switch stack forms the closed-loop link topology. Each of the switches is polled through the links within the switch stack. If one of the switches in the switch stack fails to respond to the polling, the redundant link in the switch stack is activated. Thereafter, the switches are re-initialized to form a new switch stack in which the redundant link is activated. After re-initialization, unit IDs should be reassigned to respective switches in the new switch stack. It is also required to determine whether the new switch stack has changed from the closed-loop link topology to another link topology. If the closed-loop link topology has changed, a link connected between one switch with the lowest unit ID and another switch with the highest unit ID is identified as a disconnected link.

In yet another aspect of the invention, there is provided a method for establishing backup management in a stack of switches arranged in a closed-loop link topology. The switches in the stack include a first switch equipped with a first management module and a second switch equipped with a second management module. To begin with, a manual control device of the first switch is activated and so a link attached to a downlink port of the first switch is treated as a redundant link. The redundant link is then deactivated. Next, unit IDs are assigned to respective switches in the switch stack, wherein the first switch is assigned to a particular unit ID. According to arbitration between the management modules, the first management module in the first switch with the dedicated unit ID is determined to be a master agent for the switch stack and the second management module is determined to serve as a backup agent for the switch stack. After that, the first management module synchronizes data with the second management module. If the closed-loop link topology is changed, the redundant link is activated responsively. The switches are re-initialized to form a new switch stack in which the redundant link is activated. Once the manual control device of the first switch is activated, the first management module in the first switch has the highest priority to become the master agent for the new switch stack after re-initialization. Thus, the first management module is enabled to inherit the master role.

Further scope of the applicability of the present invention will become apparent from the detailed description given hereinafter. However, it should be understood that the detailed description and specific examples, white indicating preferred embodiments of the invention, are given by way of illustration only, since various changes and modifications within the spirit and scope of the invention will become apparent to those skilled in the art from this detailed description.

DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
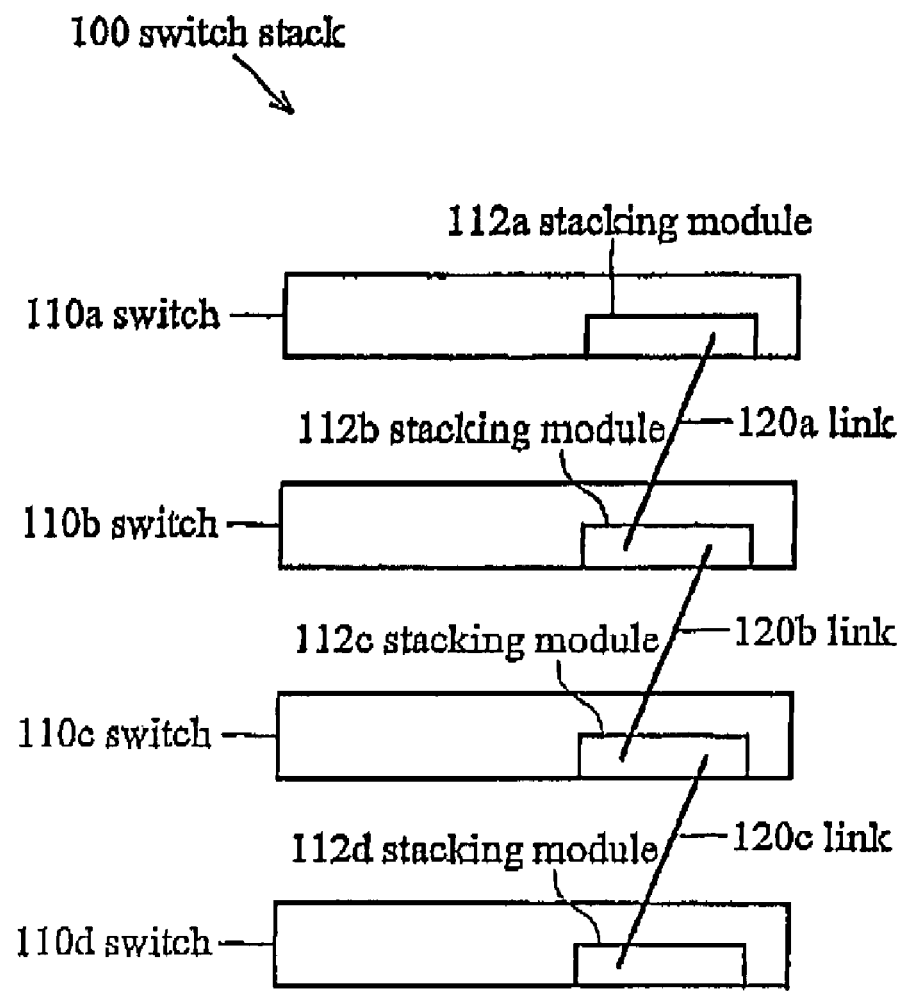
FIG. 1 illustrates stacking of switches.
Figure 2A:
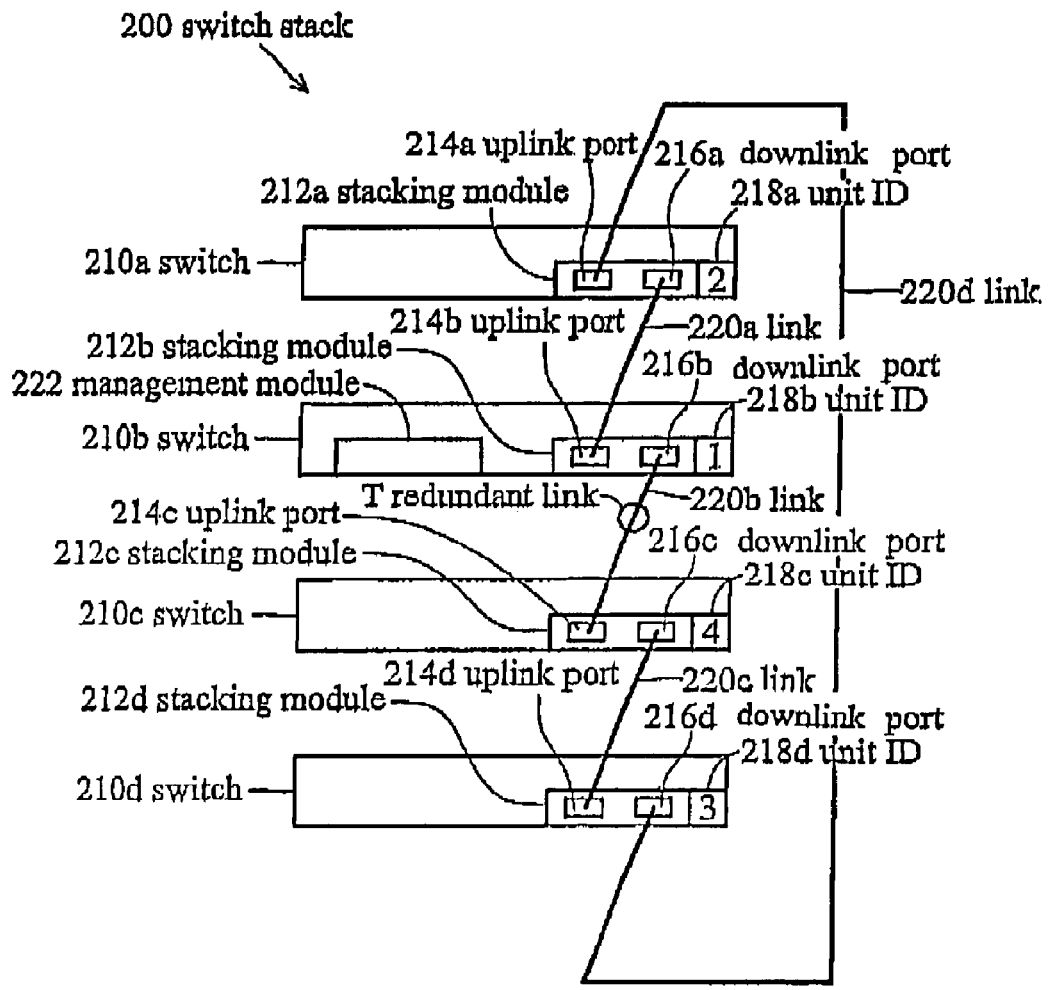
FIG. 2A is a stack of switches forming a closed-loop link topology in accordance with the invention.

As illustrated in FIG. 2A, switches 210a~d are stacked together to form a switch stack 200. Each switch—to wit, 210a, 210b, 210c and 210d—is equipped with a stacking module, 212a, 212b, 212c and 212d, respectively. Each stacking module includes an uplink port and a downlink port. On the switch 210b of the stack 200 for example, uplink port 214b connects a next-higher switch, i.e. the switch 210a, and downlink port 216b connects a next-lower switch, i.e. the switch 210c. According to the invention, every two switches are connected to form a closed-loop link topology. That is, a link 220a is connected between a downlink port 216a of the stacking module 212a and an uplink port 214b of the stacking module 212b. A link 220b is connected between a downlink port 216b of the stacking module 212b and an uplink port 214c of the stacking module 212c. As well, a link 220c is connected between a downlink port 216c of the stacking module 212c and an uplink port 214d of the stacking module 212d. Specifically, there is a link 220d connected between a downlink port 216d of the stacking module 212d and an uplink port 214a of the stacking module 212a. The switches 210a~d are connected together in the above-described manner to form the closed-loop link topology instead of a simple chain.

Figure 2B:
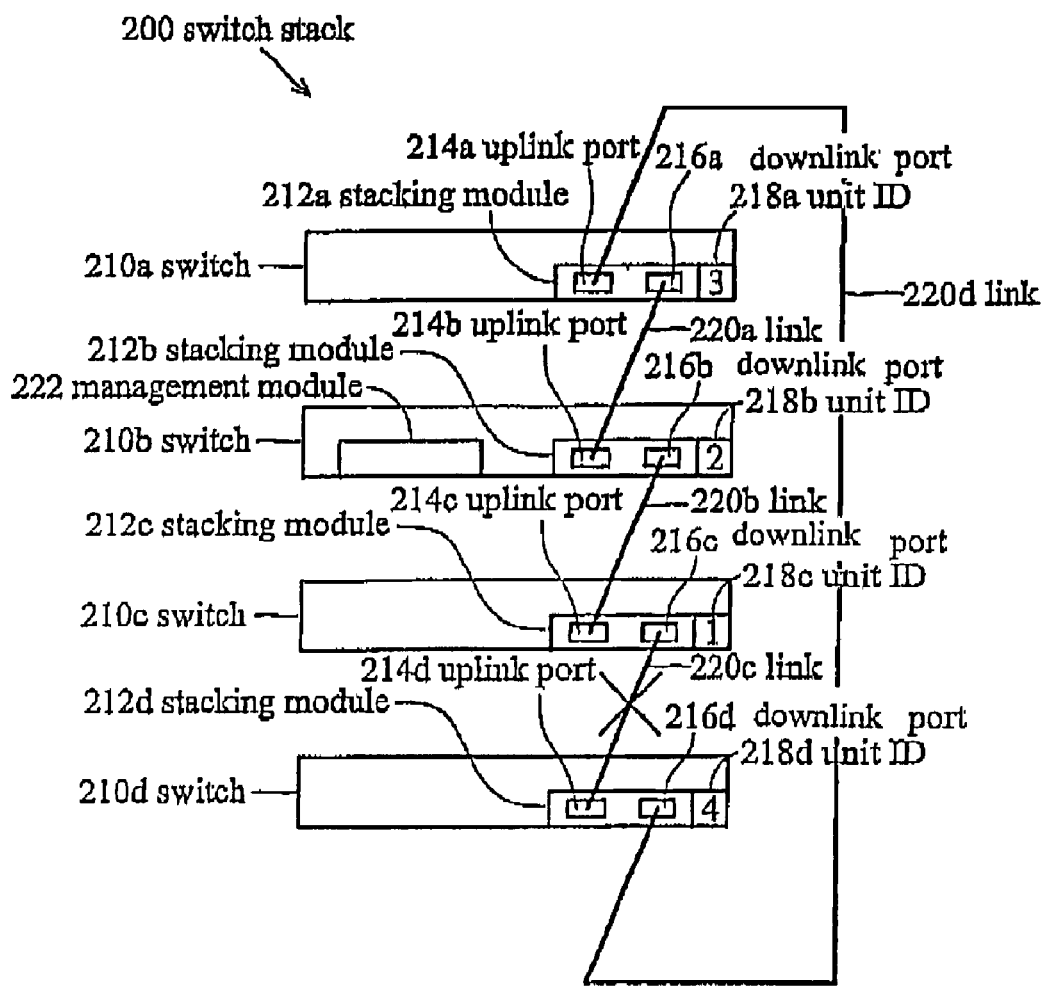
FIG. 2B illustrates one stacking recovery example in accordance with the invention.
Figure 2C:
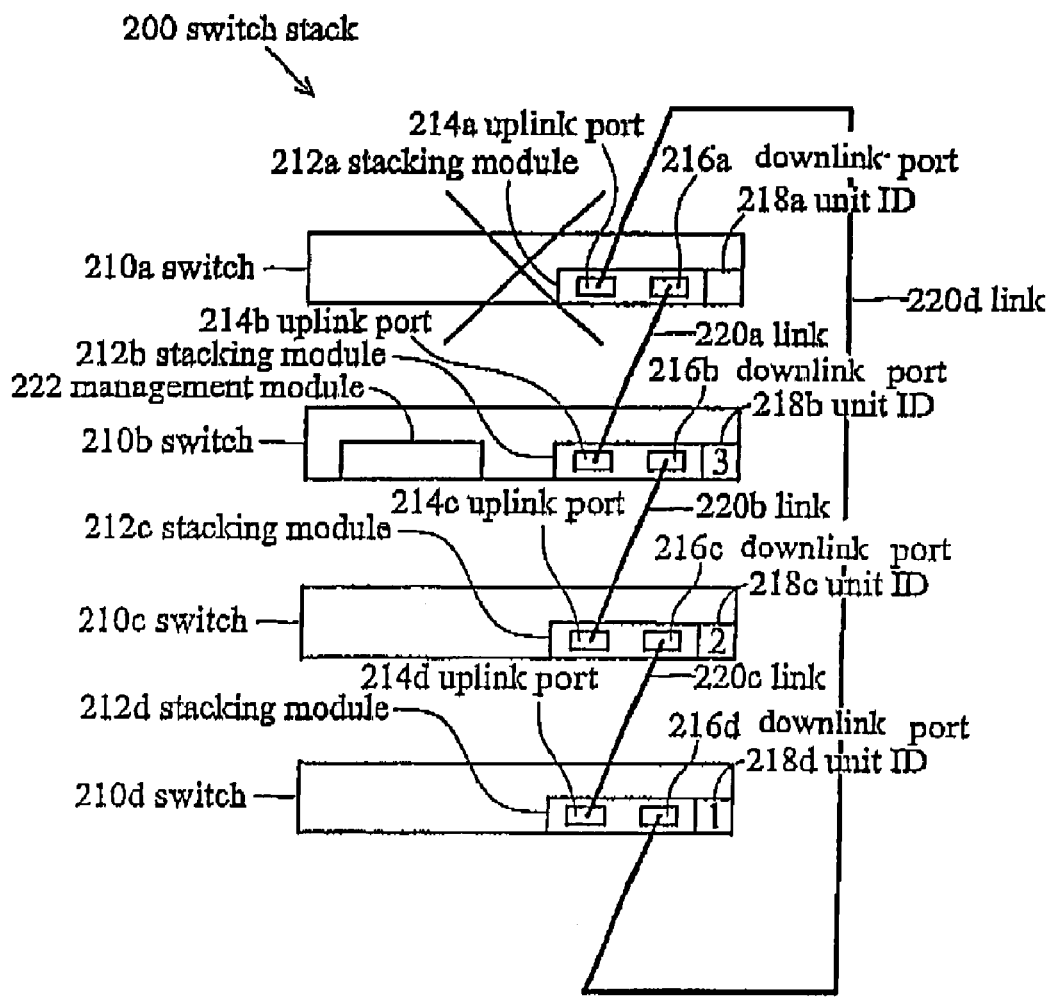
FIG. 2C illustrates another stacking recovery example in accordance with the invention.
Figure 2D:
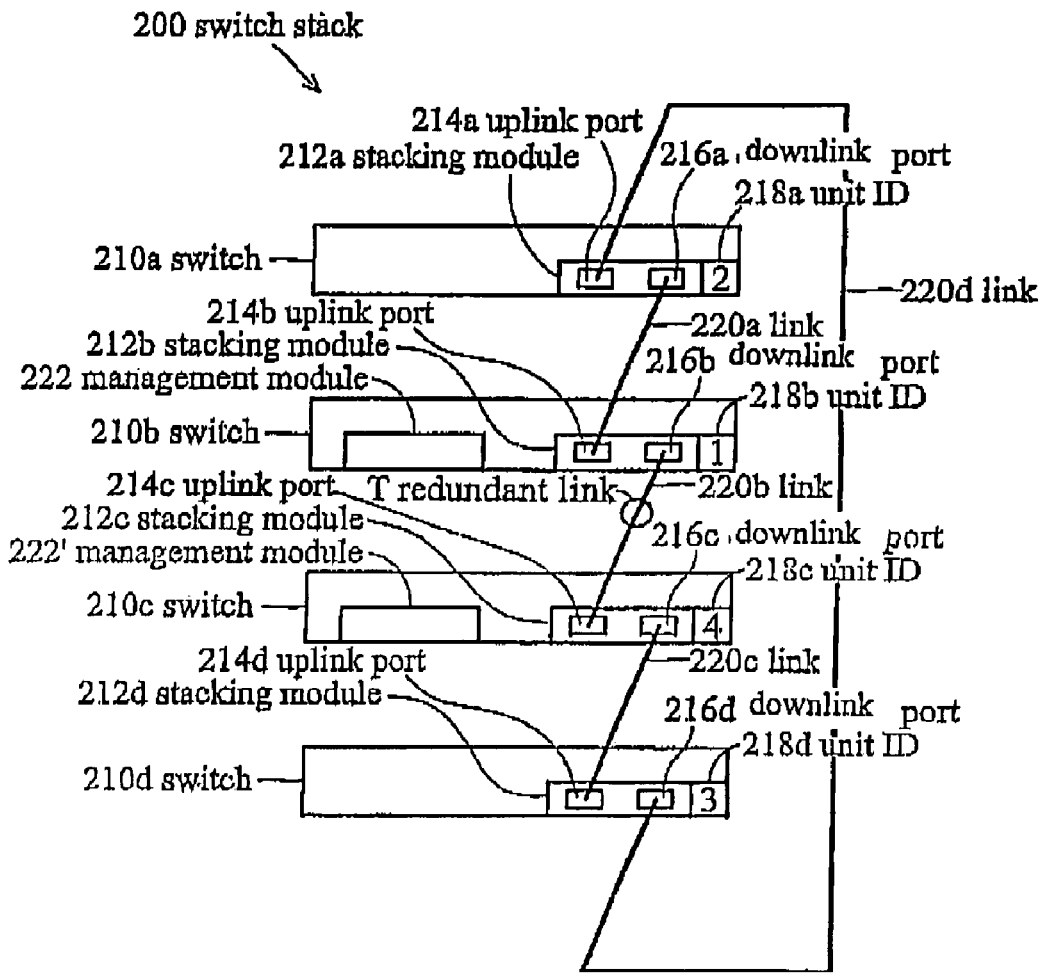
FIG. 2D is a stack of switches forming the closed-loop link topology as an illustration of backup management.

At least one switch in the switch stack 200 can be equipped with an agent module, e.g. management module 222. In one embodiment, the management module 222 is installed in the switch 210b. The management module 222 allows administrators to configure or monitor the switch stack using the network management applications. In addition, the management module 222 performs a redundant link management function. When the management module 222 is installed, the switch 210b becomes a redundant link management switch in the switch stack 200. It should be understood to those skilled in the art that additional switches equipped with the management modules to provide fault tolerance are contemplated by the principles of the invention. As shown in FIG. 2D, for instance, a second management module 222' is installed in the switch 210c to serve as a backup.

Returning again to FIG. 2A, every unit IDs 218a~d in the respective switches continues changing at power-on if the switches 210a~d are connected with the closed-loop link topology in accordance with the invention. During power-on initialization, the management module 222 informs the stacking module 212b to block the signals of downlink port 216b so that the link 220b (marked 'T' in FIG. 2A) is terminated or isolated. As a result, the switches 210a~d in the stack 200 transmit/receive control signals over a path including the links 220a, 220c, 220d like the simple chain, in which the link 220b is a redundant link for the stack 200. After initialization, digit '1' is assigned to the unit ID 218b of the switch 210b, digit '2' is assigned to the unit ID 218a of the switch 210a, and digits '3' and '4' are respectively assigned to the unit IDs 218d, 218c of the switch 210d, 210c.

In case of a link or switch failure in the switch stack 200, the redundant link 220b of the invention provides the ability to automatically recover from such failures. Referring to FIG. 2B, if the link 220c fails for some reason, the management module 222 informs the stacking module 212b to enable the downlink port 216b so as to reconnect the link 220b upon detecting the failure. Then, the switches 210a~d are re-initialized and digits '3', '2', '1', '4' are respectively reassigned to the unit IDs 218a~d of the switches 210a~d as depicted. With the redundant link 220b, the switches 210a~d can be re-stacked together to form a new switch stack 200' without manual operation. In another example, where the switch 210a is down as shown in FIG. 2C, the redundant link 220b is reactivated to recover the stack from the failure. As depicted, digits '3', '2', '1' are respectively reassigned to the unit IDs 218b~d now and a new switch stack 200" is formed by the remaining switches 210b~d in the manner described above.

Figure 3A:
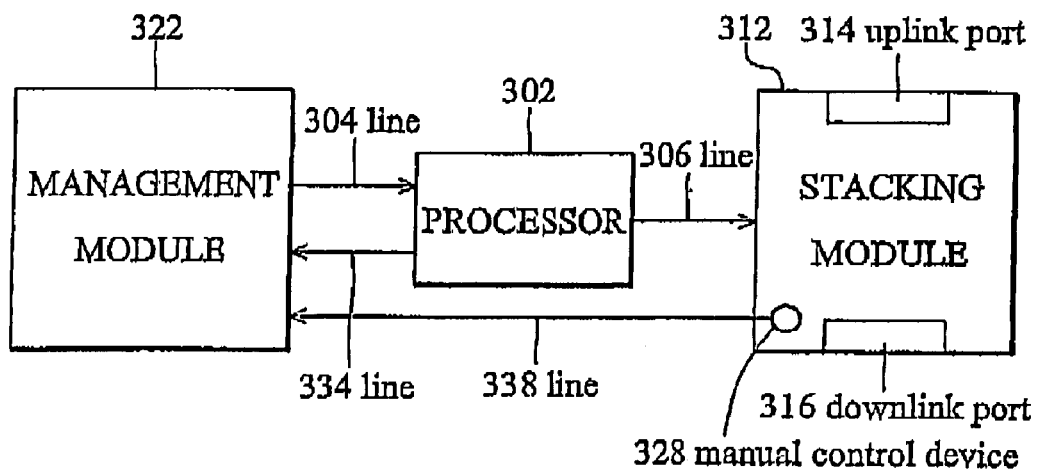
FIG. 3A is a simplified block diagram of a redundant link management switch of the invention.

A key goal of the invention is to provide a redundant link management switch which realizes the closed-loop link topology. Referring to FIG. 3A, a redundant link management switch includes a stacking module 312, a processor 302 and a management module 322. The stacking module 312 has an uplink port and a downlink port. The uplink port is used to connect a next-higher switch in a switch stack, and the downlink port is used to connect a next-lower switch in the switch stack. Of course, the terms up, down, higher, lower, etc., are merely for explanation and the physical locations of switches in the stack can vary, especially as switches are added, removed, or replaced. According to the invention, the redundant link is defined as a link connected between the downlink port of the redundant link management switch and the next-lower switch. In the case of two or more management modules within a stack of switches, the redundant link management switch is meant to be the switch assuming the master role.

Figure 3B:
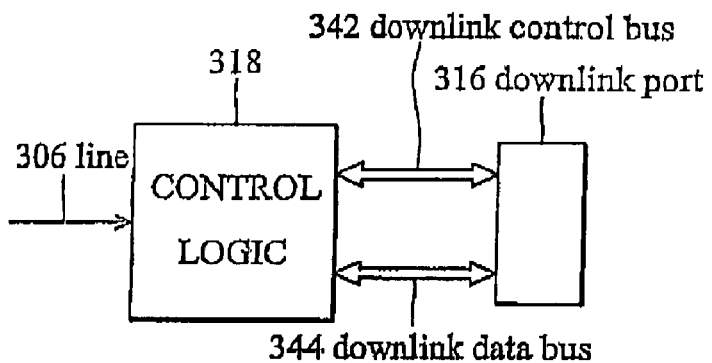
FIG. 3B is a block diagram of a control logic incorporated in a stacking module.

The processor 302 instructs the stacking module 312 via a line 306 to disable a downlink control bus within the downlink port 316 when receiving a disconnect command, and instructs the stacking module 312 via the line 306 to enable the downlink control bus when receiving a reconnect command. The processor 302 also provides a link status, via a line 334, to the management module 322. In one embodiment, the stacking module 312 has a control logic 318 coupled to the downlink port 316 as shown in FIG. 3B. Typically, the signals passed through the downlink port 316 include a downlink control bus 342 and a downlink data bus 344. When the processor 302 receives the disconnect command, it instructs the control logic 318 via the line 306 to isolate the redundant link by disabling the downlink control bus 342 within the downlink port 316. When the processor 302 receives the connect command, it instructs the control logic 318 via the line 306 to recover the redundant link by enabling the downlink control bus 342.

The management module 322 performs a redundant link management function. In one embodiment, the stacking module 312 has a manual control device 328, such as a button, to enable the redundant link management function when the management module 322, via a line 338, detects that the manual control device 328 is activated. The stacking module 312 preferably includes an LED (not shown) to indicate whether the redundant link management function is enabled or not. According to the invention, the management module 322 issues the disconnect command via a line 304 to the processor 302 if the link status indicates that the redundant link management switch and the stack of switches are stacked into the closed-loop link topology. In one embodiment, the processor 302 generates a unit ID of the switch to signal the link status. In this regard, the link status indicates that the switches within the stack are arranged in a closed-loop link topology when the unit ID continues changing during initialization. The processor 302 reports the link status to the management module 322 accordingly. In addition, the management module issues the reconnect command via the line 304 to the processor 302 to recover the redundant link if the management module 322 detects that the closed-loop link topology has changed whenever a failure occurs in one of the switches or links within the switch stack.

Figure 4A:
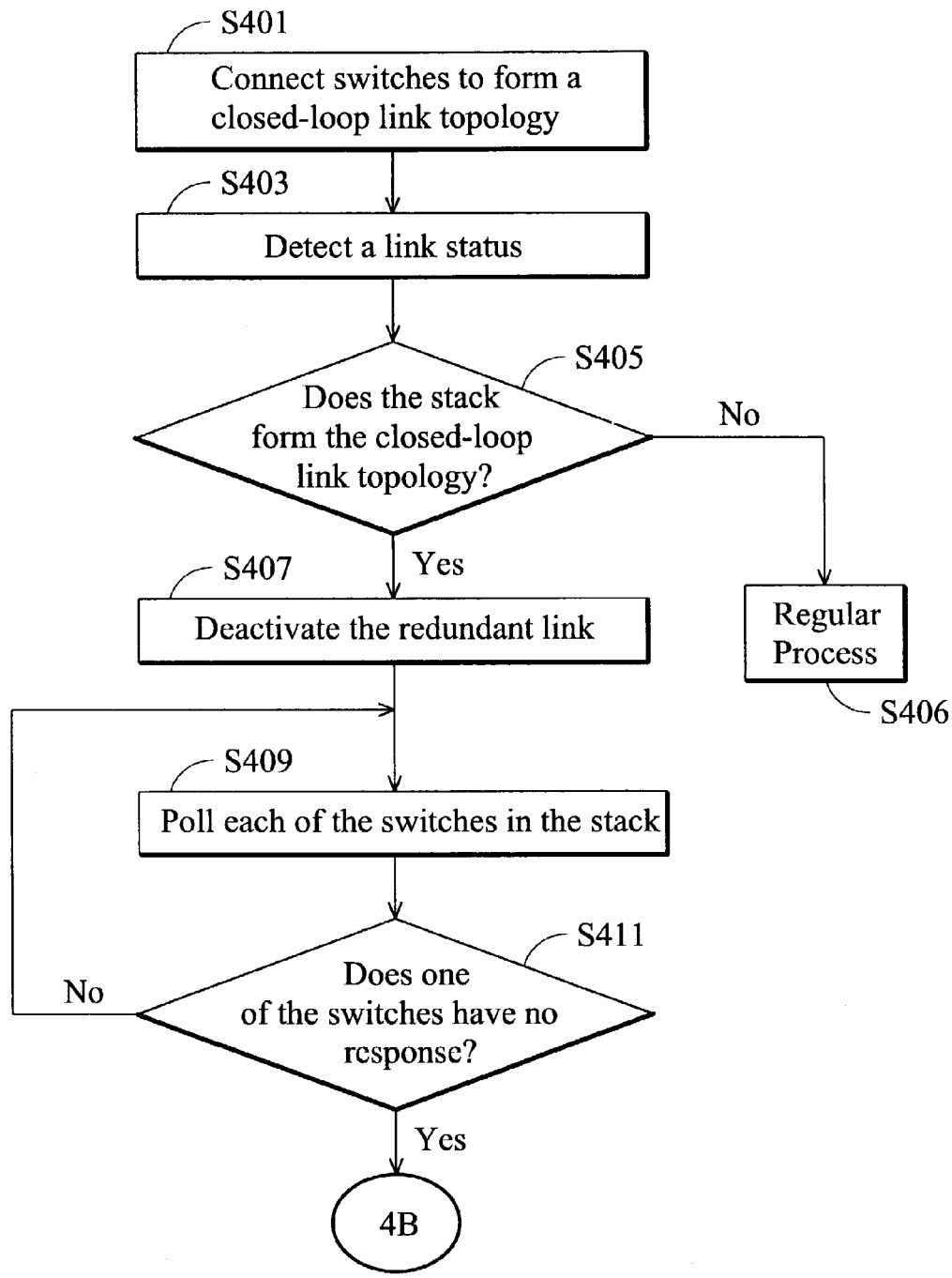
FIGS. 4A and 4B show a flowchart for identification of a failed link in accordance with the invention.
Figure 4B:
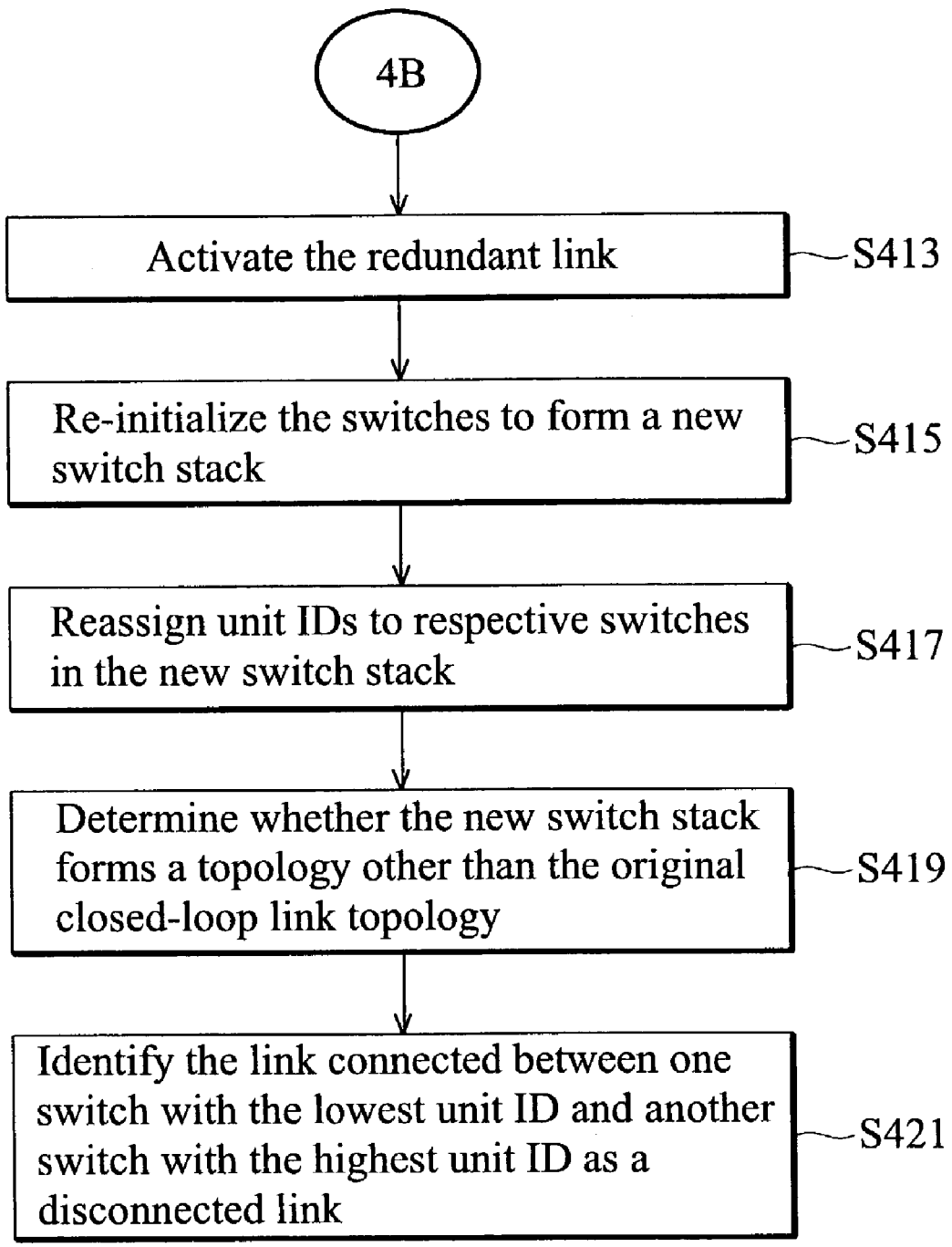

FIGS. 4A and 4B illustrate the primary steps for identification of a failed link in accordance with the invention. Of course, every two switches in the switch stack are first connected via links including the redundant link to form the closed-loop link topology (step S401). Taking the stack 200 of FIG. 2A as an example, the redundant link is the link 220b. During power-on initialization, the management module 322 detects the link status (step S403). The link status is than checked to see whether the stack is arranged in the closed-loop link topology (step S405). If so, the redundant link in the stack is deactivated (step S407). Further, when the manual control device 328 for enabling the redundant link function is activated and the unit ID keeps changing, the control logic 318 is instructed to disable the downlink control bus 342 in the redundant link. Otherwise, a regular process for a stack connected as the simple chain can be executed (step S406). After initialization, each of the switches in the stack is assigned a fixed unit ID. Each switch is polled through the links within the switch stack (step S409). Although control signals in the redundant link are blocked, the switches 210b and 210c of FIG. 2A may still communicate with each other through the link 220b. If any link including the redundant link has failed, the disconnected location will be identified by the following steps of the invention.

If one of the switches in the switch stack fails to respond to the polling (step S411), the redundant link in the switch stack is activated (step S413). The control logic 318 is instructed to enable the downlink control bus 342 in the redundant link, thereby recovering the redundant link in the switch stack. Thereafter, the switches are re-initialized (step S415), and thus the switches can be re-stacked together to form a new switch stack without manual operation, in which the redundant link is activated. When the new stack is formed, the switches therein are reassigned to respective unit IDs (step S417). Notably, if a switch in the new switch stack has a downlink port with no active control signal, this switch is assigned to the lowest unit ID in accordance with the invention. Furthermore, another switch in the new switch stack is assigned to the highest unit ID if that switch has an uplink port with no active control signal. Referring again to the stacking recovery example of FIG. 2B, the unit ID of switch 210c is the lowest—'1' and unit ID of switch 210d is the highest—'4'. In one embodiment, the management module serving as the master agent may keep a history record of link topology. Hence the history record is examined to determine whether the new switch stack has changed from the original closed-loop link topology to another link topology, namely the simple chain, after re-initialization (step S419). If the original closed-loop link topology has changed, the link connected between a switch with the lowest unit ID and another switch with the highest unit ID as a disconnected link (step S421). Taking FIG. 2B as an example, the link 220c is accordingly identified as the disconnected or failed link. The new switch stack can preferably send a trap to notify the network administrator of the actual location of the failed link.

Figure 2E:
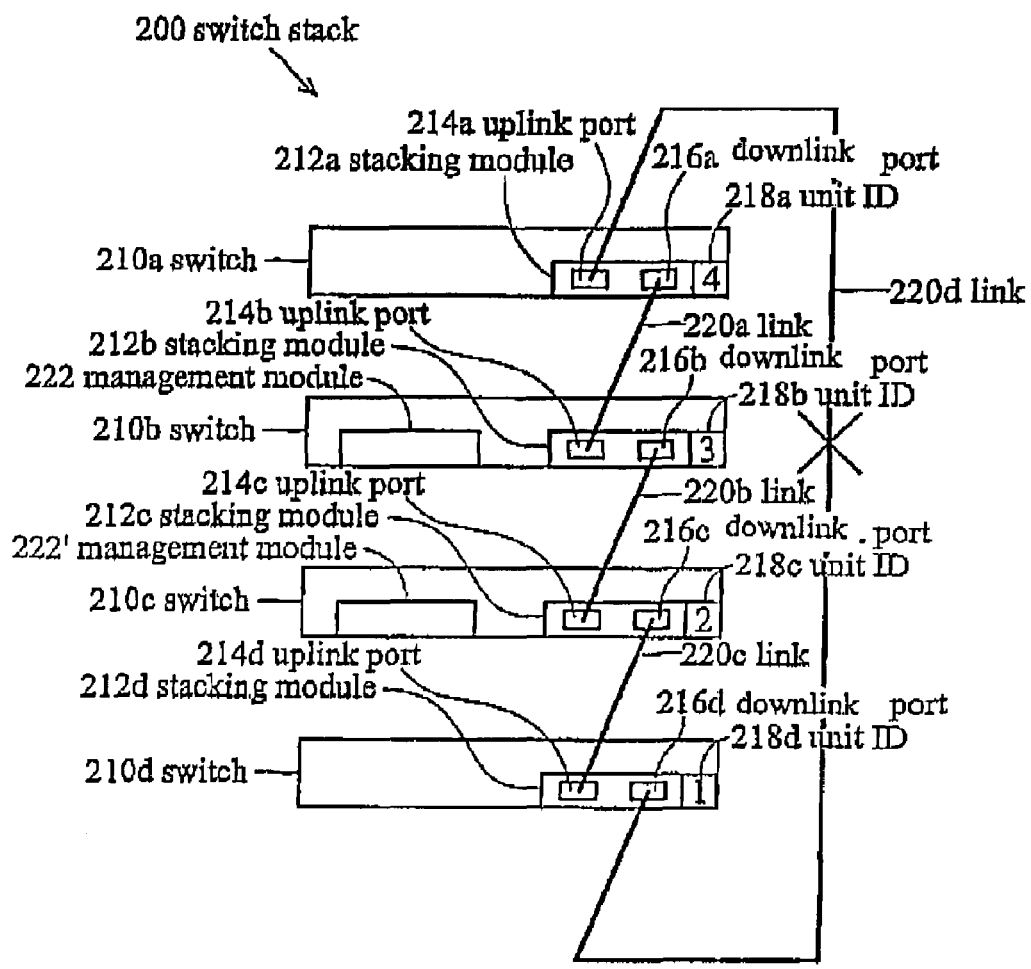
FIG. 2E illustrates the inheritable master feature of the invention.
Figure 5A:
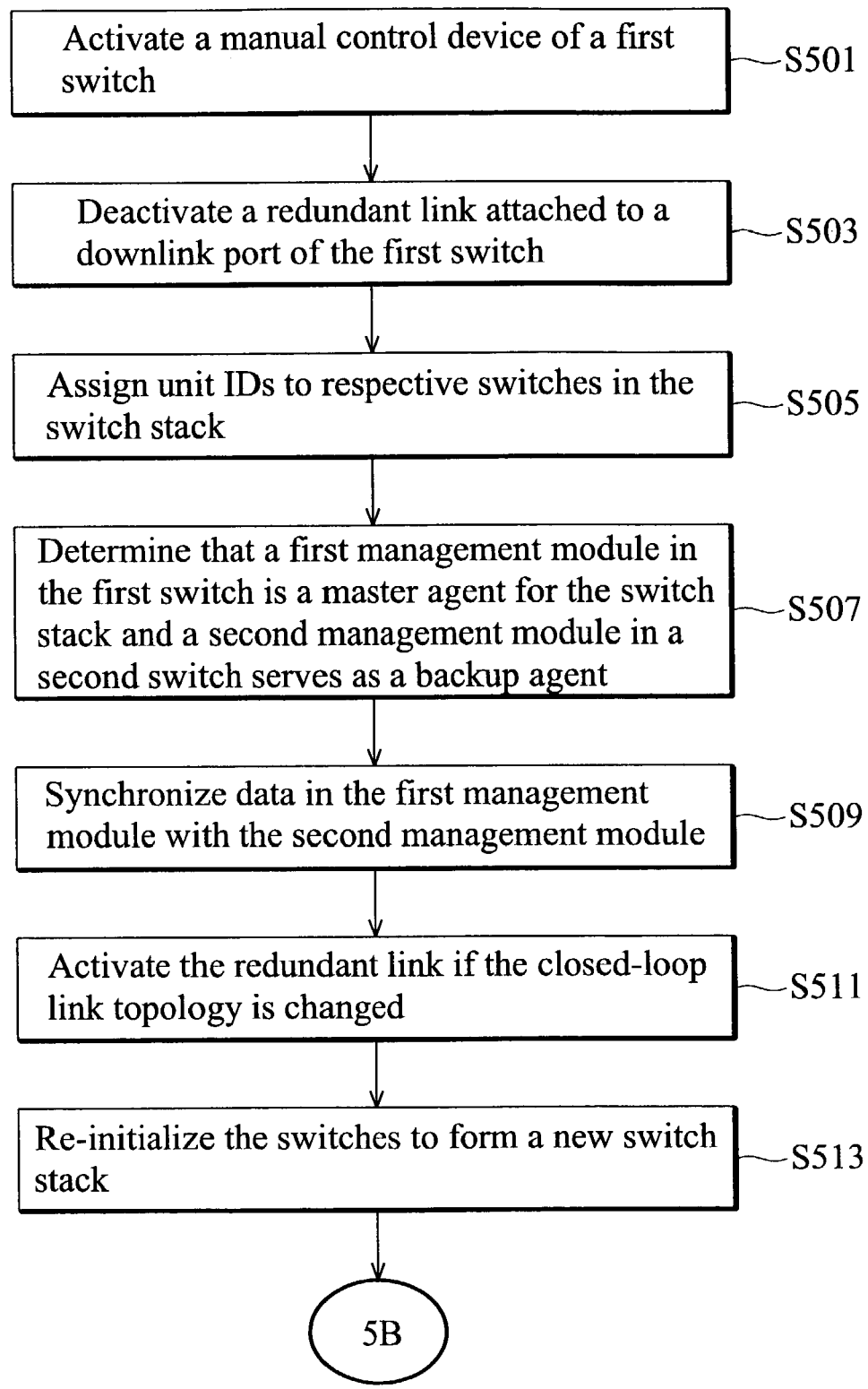
FIGS. 5A and 5B show a flowchart for backup management in accordance with the invention.
Figure 5B:
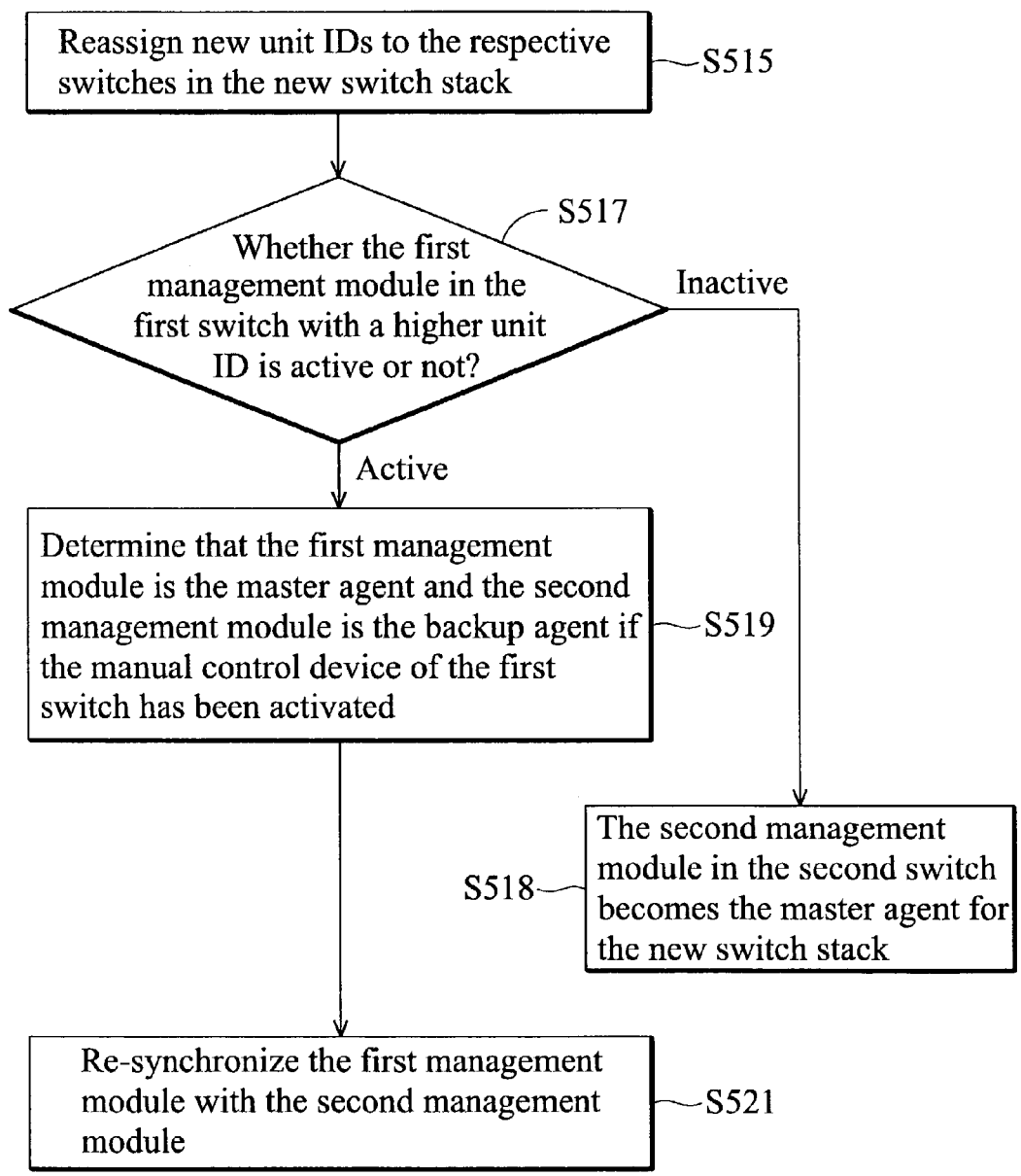

To establish backup management and fault tolerance, two or more management modules must be installed in separate stackable switches. Once the manual control device 328 on a stacking module is activated in such a circumstance, the management module in the same switch as the stacking module has the highest priority to become a master agent for a stack of switches. The invention will be more clearly described by a flowchart in FIGS. 5A through 5B taken in conjunction with examples of FIGS. 2D and 2E. Referring to FIG. 2D, a stack 200 includes a switch 210b equipped with a management module 222 and a switch 210c equipped with a management module 222'. From the beginning of FIG. 5A, a manual control device 328 on a stacking module 212b of the switch 210b is activated for example (step S501). Therefore, a link 220b attached to a downlink port 216b of the switch 210b is treated as a redundant link according to the above discussion. Then, the link 220b is deactivated by disabling a downlink control bus within the downlink port 216b (step S503). After that, unit IDs are assigned to respective switches in the stack 200 so the switch 210*b* has a particular unit ID, i.e., the lowest ID—'1' (step S505). According to arbitration between the management modules 222 and 222', the management module 222 in the switch 210*b* with the lowest unit ID is determined to be a master agent for the switch stack 200 and the management module 222' is determined to serve as a backup agent that takes over if the master agent fails (step S507). Next, the management module 222 synchronizes data with the management module 222' (step S509). If a link 220*d* fails as shown in FIG. 2E and causes disruption of the closed-loop link topology, the redundant link namely the link 220*b* is activated responsively (step S511). The switches 210*a*~*d* are re-initialized to form a new switch stack 200''' in which the link 220*b* is activated now (step S513).

After re-initialization, the respective switches in the new switch stack are assigned new unit IDs and the lowest unit ID is specified to one of the switches whose downlink port has no active control signal (step S515). Referring to FIG. 2E, the unit ID of switch 210*d* is '1' due to the failed link 220*d* and the unit IDs of the switches 210*a*~*c* are '4', '3' and '2', respectively. In this case, the unit ID of switch 210*c* is lower than the unit ID of the switch 210*b*. The management module 222' in the switch 210*c* enters a temporary master state to detect whether the management module 222 in the switch 210*b* with a higher unit ID is still active (step S517). If the management module 222 is inactive or failed, the management module 222' takes over the master role indeed to act as the master agent for the new switch stack 200''' (step S518). If the management module 222 is active and the manual control device of the switch 210*b* has been activated, the management module 222' exits the temporary master state and remains in the previous backup role. Consequently, the management module 222 in the switch 210*b* is determined to assume the master role for the new switch stack 200''' (step S519). Thereafter, the master agent re-synchronizes data with the backup agent (step S521). In this way, a management module in one switch takes precedence over any other management modules to become the master agent once the manual control device of that same switch is activated. Thus, that management module is enabled to inherit the master role from the previous and needs not change out of its role if possible. This prevents a switch stack from an unnecessary role change after automatic recovery of the redundant link.

Accordingly, the present invention discloses a scheme to automatically recover a switch stack in case of switch or link failure. The invention also proposes a way to detect a failed link within a stack of switches forming a closed-loop link topology. Moreover, a mechanism featuring the inheritable master role is provided to ease backup management in a stack of switches arranged in a closed-loop link topology.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of managing a redundant link for use in a stack of switches comprising the steps of:

connecting every two switches in the switch stack via links including the redundant link to form a closed-loop link topology;

detecting a link status;

deactivating the redundant link if the link status indicates that the switch stack forms the closed-loop link topology;

polling each of the switches through the links within the switch stack;

activating the redundant link in the switch stack if one of the switches in the switch stack fails to respond to the polling;

re-initializing the switches to form a new switch stack in which the redundant link is activated;

reassigning unit IDs to respective switches in the new switch stack;

determining whether the new switch stack has changed from the original closed-loop link topology to another link topology; and identifying a link connected between the first switch with the lowest unit ID and the second switch with the highest unit ID as a disconnected link if the closed-loop link topology is changed; and wherein a first switch in the new switch stack is assigned to a lowest unit ID if the first switch has a downlink port with no active control signal;

wherein a second switch in the new switch stack is assigned to a highest unit ID if the second switch has an uplink port with no active control signal.

2. The method of claim 1 wherein the deactivating step disables a downlink control bus in the redundant link if a manual control device for enabling a redundant link function is activated and the link status indicates the switch stack forming the closed-loop link topology.

3. The method of claim 2 wherein the activating step enables the downlink control bus in the redundant link, thereby recovering the redundant link in the switch stack.

4. A method for establishing backup management in a stack of switches arranged in a closed-loop link topology, the stack of switches including a first switch equipped with a first management module and a second switch equipped with a second management module, the method comprising the steps of:

activating a manual control device of the first switch;

deactivating a redundant link attached to a downlink port of the first switch;

assigning unit IDs to respective switches in the switch stack, wherein the first switch is assigned to a particular unit ID;

determining that the first management module in the first switch with the dedicated unit ID is a master agent for the switch stack and the second management module serves as a backup agent for the switch stack;

synchronizing data in the first management module with the second management module;

activating the redundant link if the closed-loop link topology has changed;

re-initializing the stack of switches to form a new switch stack in which the redundant link is activated;

assigning new unit IDs to the respective switches in the new switch stack, wherein the lowest unit ID is assigned to one of the switches whose downlink port has no active control signal;

detecting, at the second management module in the second switch with a lower unit ID, whether the first management module in the first switch with a higher unit ID is active; and determining that the first management module is the master agent for the new switch stack and the second management module is the backup agent for the new switch stack if the first management module in the first switch with the higher unit ID is active and the manual control device of the first switch has been activated.

5. The method of claim 4 wherein the first management module in the first switch has the highest priority to become the master agent for the stack of switches if the manual control device of the first switch is activated.

6. The method of claim 4 further comprising the step of: determining that the second management module in the second switch takes over the master agent for the new switch stack if the first management module in the first switch is inactive.

7. The method of claim 4 further comprising the step of: re-synchronizing the first management module with the second management module if the first management module in the first switch is active.

8. The method of claim 4 wherein the particular unit ID is the lowest unit ID within the stack of the switches.

9. The method of claim 4 wherein the closed-loop link topology is changed whenever a failure occurs in one of the switches or links within the switch stack.

* * * * *